United States Patent
Kawanishi (10) Patent No.: US 9,335,959 B2
(45) Date of Patent: May 10, 2016

(54) IMAGE FORMING APPARATUS OPERABLE TO FORM DATA BASED ON DRIVER TYPE, METHOD OF CONTROLLING IMAGE FORMING APPARATUS, AND STORAGE MEDIUM

(71) Applicant: CANON KABUSHIKI KAISHA, Tokyo (JP)

(72) Inventor: Masaki Kawanishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 13/963,784

(22) Filed: Aug. 9, 2013

(65) Prior Publication Data
US 2014/0043638 A1 Feb. 13, 2014

(30) Foreign Application Priority Data
Aug. 13, 2012 (JP) ................................. 2012-179427

(51) Int. Cl.
*G06F 3/12* (2006.01)

(52) U.S. Cl.
CPC ............ *G06F 3/1238* (2013.01); *G06F 3/1206* (2013.01); *G06F 3/1208* (2013.01); *G06F 3/1248* (2013.01); *G06F 3/1267* (2013.01); *G06F 3/1286* (2013.01); *G06F 3/1291* (2013.01); *G06F 3/1258* (2013.01)

(58) Field of Classification Search
CPC ... G06F 3/1238; G06F 3/1248; G06F 3/1258; G06F 3/1267; G06F 3/1286; G06F 3/1291
USPC .................................................. 358/1.13, 1.15
See application file for complete search history.

(56) References Cited

U.S. PATENT DOCUMENTS

| | | | | |
|---|---|---|---|---|
| 8,040,547 | B2* | 10/2011 | Ando | G06F 21/34 358/1.15 |
| 8,312,527 | B2* | 11/2012 | Hashimoto | G06F 21/335 713/156 |
| 8,379,249 | B2* | 2/2013 | Kusakabe | 358/1.15 |
| 8,867,051 | B2* | 10/2014 | Morii | 358/1.13 |
| 2002/0027673 | A1* | 3/2002 | Roosen et al. | 358/1.13 |
| 2006/0192997 | A1* | 8/2006 | Matsumoto et al. | 358/1.15 |
| 2010/0214587 | A1* | 8/2010 | Sambe | 358/1.13 |

FOREIGN PATENT DOCUMENTS

JP 4033857 B2 1/2008

* cited by examiner

*Primary Examiner* — Allen H Nguyen
(74) *Attorney, Agent, or Firm* — Canon USA Inc. IP Division

(57) ABSTRACT

An image forming apparatus is provided, including a storage unit configured to store print data, a reception unit configured to receive device information for identifying a device to print the print data, and a control unit configured to determine whether the stored print data stored is generated by a printer driver common to a plurality of models or by a printer driver corresponding to a model of the device identified by the received device information, and to restrict printing of the stored print data if the stored print data is not generated by the printer driver common to the models and if the stored print data is not generated by the printer driver corresponding to the model of the device identified by the received device information.

5 Claims, 11 Drawing Sheets

| USER NAME 300 | DRIVER INFORMATION 302 | DEVICE IDENTIFICATION INFORMATION 304 | |
|---|---|---|---|
| USER1 | COMMON TO MODELS | A001 | ~306 |
| USER1 | MODEL A | A001 | ~308 |
| USER2 | MODEL B | B001 | ~310 |
| USER1 | COMMON TO MODELS | A002 | ~312 |
| USER1 | MODEL A | A002 | ~314 |
| USER1 | MODEL A | A003 | ~316 |

FIG.5

| 500<br>USER NAME | 502<br>DRIVER INFORMATION | 504<br>DEVICE IDENTIFICATION INFORMATION | 518<br>PRINTABILITY DETERMINATION RESULT |
|---|---|---|---|
| USER1 | COMMON TO MODELS | A001 | ○ ~506 |
| USER1 | MODEL A | A001 | ○ ~508 |
| USER2 | MODEL B | B001 | × ~510 |
| USER1 | COMMON TO MODELS | A002 | ○ ~512 |
| USER1 | MODEL A | A002 | ○ ~514 |
| USER1 | MODEL A | A003 | ○ ~516 |

| USER NAME: USER1 | | | |
|---|---|---|---|
| DOCUMENT NAME | PRINT SETTING | NUMBER OF PAGES/ NUMBER OF COPIES | DATE/TIME |
| DOCUMENT 1.doc | COLOR / TWO-SIDED 2 in 1 | 4 PAGES 1 COPY | 2012/02/03 14:20:30 |
| DOCUMENT 2.xls | MONOCHROME / TWO-SIDED 4 in 1 | 10 PAGES 2 COPIES | 2012/02/03 14:22:00 |
| DOCUMENT 3.ppt | COLOR / ONE-SIDED 2 in 1 | 5 PAGES 1 COPY | 2012/02/03 15:02:12 |
| DOCUMENT 4.txt | MONOCHROME / ONE-SIDED 1 in 1 | 3 PAGES 1 COPY | 2012/02/04 09:03:54 |
| DOCUMENT 5.doc | MONOCHROME / TWO-SIDED 2 in 1 | 6 PAGES 3 COPIES | 2012/02/04 11:15:00 |

1/1  △  ▽

SELECT ALL | CANCEL SELECTION | DELETE | CHANGE PRINT SETTING | START PRINTING

FIG.8

| USER NAME: USER1 | | ☑ DISPLAY ONLY PRINT JOBS OF WHICH OUTPUT IS ENSURED | | 1/1 ◁ ▷ |
|---|---|---|---|---|
| DOCUMENT NAME | PRINT SETTING | | NUMBER OF PAGES/ NUMBER OF COPIES | DATE/TIME |
| DOCUMENT 1.doc | COLOR | TWO-SIDED 2 in 1 | 4 PAGES 1 COPY | 2012/02/03 14:20:30 |
| DOCUMENT 2.xls | MONOCHROME | TWO-SIDED 4 in 1 | 10 PAGES 2 COPIES | 2012/02/03 14:22:00 |
| DOCUMENT 3.ppt | COLOR | ONE-SIDED 2 in 1 | 5 PAGES 1 COPY | 2012/02/03 15:02:12 |
| DOCUMENT 4.txt | MONOCHROME | ONE-SIDED 1 in 1 | 3 PAGES 1 COPY | 2012/02/04 09:03:54 |
| DOCUMENT 5.doc | MONOCHROME | TWO-SIDED 2 in 1 | 6 PAGES 3 COPIES | 2012/02/04 11:15:00 |

SELECT ALL | CANCEL SELECTION | DELETE | CHANGE PRINT SETTING | START PRINTING

FIG.9

| 900 | 902 | 904 | 918 | |
|---|---|---|---|---|
| USER NAME | DRIVER INFORMATION | DEVICE IDENTIFICATION INFORMATION | DEVICE CONFIGURATION INFORMATION | |
| USER1 | COMMON MODEL | A001 | WITH FINISHER | ~906 |
| USER1 | MODEL A | A001 | WITH FINISHER | ~908 |
| USER2 | MODEL B | B001 | WITH FINISHER | ~910 |
| USER1 | COMMON MODEL | A002 | WITHOUT FINISHER | ~912 |
| USER1 | MODEL A | A002 | WITHOUT FINISHER | ~914 |
| USER1 | MODEL A | A003 | WITH FINISHER | ~916 |

| USER NAME 1100 | DRIVER INFORMATION 1102 | DEVICE IDENTIFICATION INFORMATION 1104 | DEVICE CONFIGURATION INFORMATION 1118 | PRINTABILITY DETERMINATION RESULT 1120 |
|---|---|---|---|---|
| USER1 | COMMON MODEL | A001 | WITH FINISHER | ◯ ~1106 |
| USER1 | MODEL A | A001 | WITH FINISHER | ◯ ~1108 |
| USER2 | MODEL B | B001 | WITH FINISHER | ✕ ~1110 |
| USER1 | COMMON MODEL | A002 | WITHOUT FINISHER | ◯ ~1112 |
| USER1 | MODEL A | A002 | WITHOUT FINISHER | ✕ ~1114 |
| USER1 | MODEL A | A003 | WITH FINISHER | ◯ ~1116 | though, a print job in many cases is submitted using a model-specific printer driver.

IMAGE FORMING APPARATUS OPERABLE TO FORM DATA BASED ON DRIVER TYPE, METHOD OF CONTROLLING IMAGE FORMING APPARATUS, AND STORAGE MEDIUM

BACKGROUND

1. Technical Field

Aspects of the present invention relate to an image forming apparatus, a method of controlling an image forming apparatus, and a storage medium.

2. Description of the Related Art

There is increasing demand for "remote printing" in which a user can cause any printer to print a print job of the user. In existing print systems, however, a print job submitted by the user can be printed only by a printer to which the print job has been submitted.

To solve the above problem, a technique is discussed where a user submits a print job to a print server, the print server stores the print job, and a printer to execute the printing receives and prints the print job (for example, Japanese Patent No. 4033857). The Japanese Patent No. 4033857 discusses that a user submits a print job to a print server to transmit bibliographic information to a bibliography server. When a printer prints the print job, the printer obtains a print job list from the bibliography server, selects the print job to be printed, and gives an instruction to print the print job. In response, the bibliography server gives the print server a print instruction, the print server transfers the print job to the printer, and the printer prints the print job.

In remote printing, however, it is not possible to specify a printer to perform printing at the time of the submission of a print job. This requires the print job to be model-independent data. Accordingly, print data is generated using a printer driver common to models, and the print job is submitted. Examples of a print setting that can be made by the printer driver common to models include a two-sided setting, a number-of-copies setting, and a reduction layout setting.

Meanwhile, there is a function termed "reservation printing" in which, when a print job has been submitted to a printer, the printer temporarily reserves the print job and then starts printing the print job after user authentication is completed.

Also in reservation printing, it is possible to submit a print job using a printer driver common to models. In many cases, however, a print job is submitted using a model-specific printer driver.

Examples of a print setting that can be made by the model-specific printer driver include the setting of a halftone process, and the setting of finishing such as a punch. Further, the model-specific printer driver may generate a binarized print job. The setting of the halftone process is used to select a method of converting multi-valued data into binary data. The halftone process is designed taking into account the engine characteristics of the printer, and therefore, a print job in which the setting of the halftone process has been made results in a model-dependent print job. The same applies to the case where the model-specific printer driver performs a binarization process. Further, the setting of finishing such as the punch depends on a sheet discharge option attached to the printer, and therefore, a print job in which the setting of finishing has been made results in a model-dependent print job.

Both in the remote printing and the reservation printing described above, user authentication is carried out before the start of printing, and the user selects from a print job list of the user a job to be printed, and starts printing the selected job. At this time, the print jobs of which the user names match the user name of the user are displayed as the print job list. Thus, at the time of remote printing, it is possible to select also the print job submitted for reservation printing. As a result, a different printer can print such model-dependent print job, and therefore, it may not be possible to ensure the image quality, or the print setting may not be effective.

SUMMARY

According to an aspect of the present invention, an image forming apparatus includes a storage unit configured to store print data, a reception unit configured to receive device information for identifying a device to print the print data, and a control unit configured to restrict printing of the stored print data if the stored print data is not generated by a printer driver common to a plurality of models and if the stored print data is not generated by a printer driver corresponding to the model of the device identified by the received device information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a diagram illustrating an example of a print job list screen.

DESCRIPTION OF THE EMBODIMENTS

Various exemplary embodiments, features, and aspects of the invention will be described in detail below with reference to the drawings.

Figure 1:
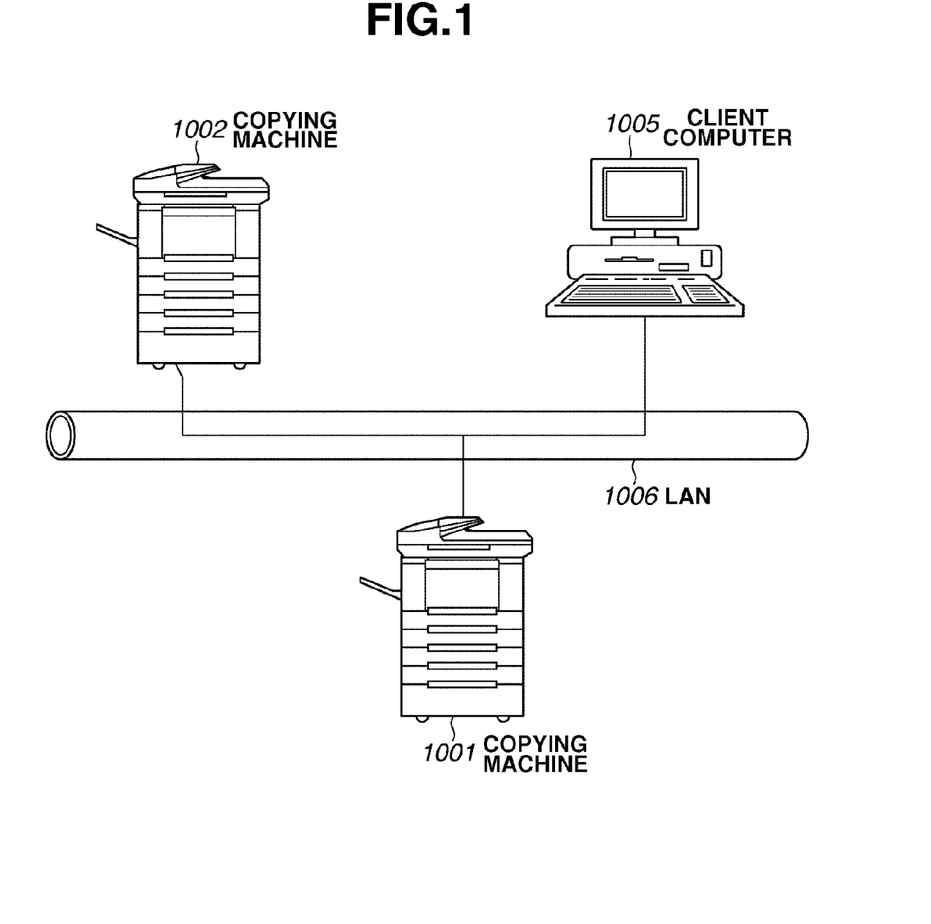
FIG. 1 is a diagram illustrating an example of a configuration of a network.

FIG. 1 is a diagram illustrating an example of the system configuration of a printing system. The present exemplary embodiments are described using as an image forming apparatus a copying machine having a data transmission function.

As illustrated in FIG. 1, a copying machine 1001, a copying machine 1002, which has functions equivalent to those of the copying machine 1001, and a client computer 1005 are connected to a local area network (LAN) 1006 based on Ethernet (registered trademark), and therefore can communicate with one another on the network.

The copying machine 1001 has a copy function and a facsimile function. The copying machine 1001 also has a data transmission function of reading a document image and transmitting the read image data to apparatuses on the LAN 1006. The copying machine 1001 also has a page description language (PDL) function, and therefore can receive and print a PDL print job issued by the client computer 1005 connected to the LAN 1006.

The copying machine 1001 can store, in a box area specified in a hard disk drive (HDD) 2004 (see FIG. 2) in the copying machine 1001, an image read by the copying machine 1001 and an image obtained by processing a PDL print job received from the client computer 1005 connected to the LAN 1006. Further, the copying machine 1001 can perform print output of the images stored in the box area.

The copying machine 1001 can receive, via the LAN 1006, data read by the copying machine 1002, and similarly to the above, store the received data in the HDD 2004 in the copying machine 1001. Further, the copying machine 1001 can perform the print output of the stored image.

The client computer 1005 is an information processing apparatus capable of receiving, via the LAN 1006, data read by the copying machine 1001, and processing and editing the received data.

Figure 2:
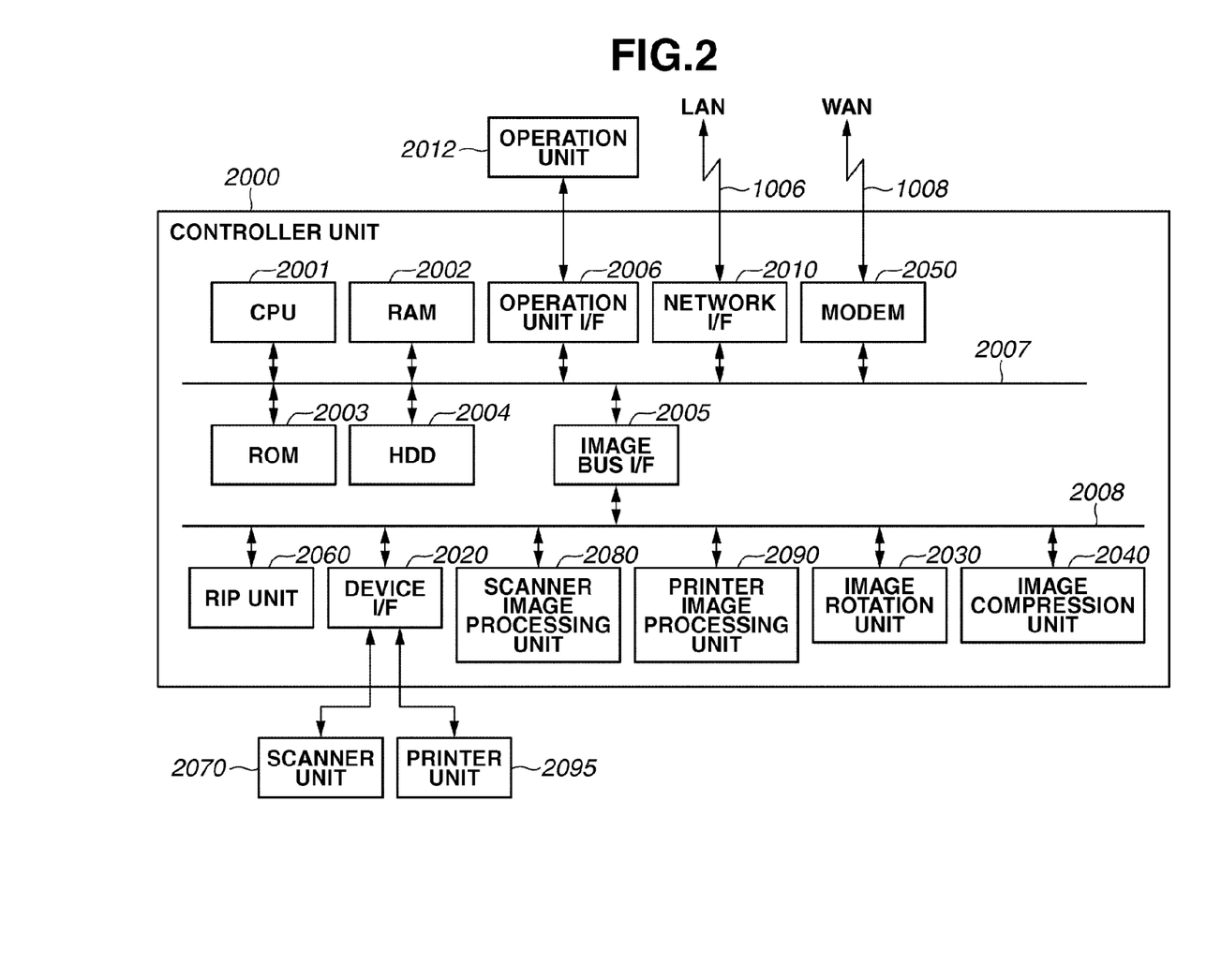
FIG. 2 is a block diagram illustrating an example of a configuration of a main part of a copying machine.

FIG. 2 is a diagram illustrating an example of a main hardware configuration of the copying machine 1001 or 1002 in FIG. 1.

A controller unit 2000 connects to a scanner unit 2070, which is an image input device, and a printer unit 2095, which is an image output device, thereby performing control so that the printer unit 2095 performs the print output of image data read by the scanner unit 2070. Further, the controller unit 2000 connects to the LAN 1006, thereby performing control to input and output image information and device information.

The controller unit 2000 includes a central processing unit (CPU) 2001.

The CPU 2001 starts an operating system (OS) by a boot program stored in a read-only memory (ROM) 2003, and executes on the OS an application program stored in the HDD 2004, thereby executing various processes.

A random access memory (RAM) 2002 is a work area for the CPU 2001 and is also an image memory area for temporarily storing image data.

The HDD 2004 stores the above application program together with image data.

The CPU 2001 is connected to the ROM 2003, the RAM 2002, an operation unit interface (I/F) 2006, a network I/F 2010, a modem 2050, and an image bus I/F 2005 via a system bus 2007.

The operation unit I/F 2006 is an interface between an operation unit 2012, which includes a touch panel and a hard key, and the controller unit 2000. The operation unit I/F 2006 outputs, to the operation unit 2012, image data to be displayed on the operation unit 2012.

Further, the operation unit I/F 2006 transmits, to the CPU 2001, information input by a user via the operation unit 2012.

The network I/F 2010 connects to the LAN 1006, thereby inputting and outputting information to and from apparatuses on the LAN 1006 via the LAN 1006.

The modem 2050 connects to a wide area network (WAN) 1008, thereby inputting and outputting information via the WAN 1008.

The image bus I/F 2005 is a bus bridge that connects the system bus 2007 to an image bus 2008 which transfers image data at high speed, thereby converting a data structure.

The image bus 2008 includes a peripheral component interconnect (PCI) bus or a bus based on the Institute of Electrical and Electronics Engineers (IEEE) 1394.

A raster image processor (RIP) unit 2060, a device I/F 2020, a scanner image processing unit 2080, a printer image processing unit 2090, an image rotation unit 2030, and an image compression unit 2040 are provided on the image bus 2008.

The RIP unit 2060 is a processor that rasterizes intermediate language data into a bitmap image.

The device I/F 2020 is connected to the scanner unit 2070 and the printer unit 2095 and performs synchronous/asynchronous conversion of image data.

The scanner image processing unit 2080 corrects, processes, and edits input image data.

The printer image processing unit 2090 performs image correction and a halftone process on print output image data.

The image rotation unit 2030 rotates image data.

The image compression unit 2040 compresses multi-valued image data into Joint Photographic Experts Group (JPEG) data, compresses binary image data into Joint Bi-level Image Experts Group (JBIG) data, Modified Modified READ (MMR) data, or Modified Huffman (MH) data, and performs a decompression process on the resulting data.

A first exemplary embodiment is described on the premise that the client computer 1005 or another client computer (not illustrated) connected to the LAN 1006 has submitted a plurality of PDL print jobs to the copying machine 1001 or 1002, and the plurality of PDL print jobs are correspondingly stored in the copying machine 1001 or 1002. Hereinafter, a PDL print job is referred to as a "print job".

The description is given using a configuration where the copying machine 1001 has a bibliography server function as well. The bibliography server, however, may be a separate device connected to the LAN 1006, and therefore, the description does not limit functions and configurations of the present exemplary embodiment.

Figure 3:
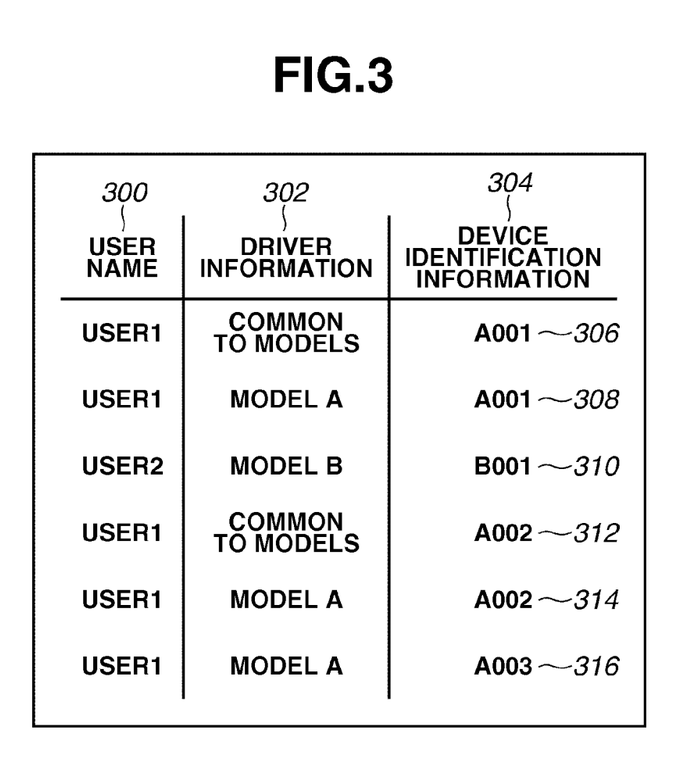
FIG. 3 is a diagram illustrating an example of a print job list.

FIG. 3 is a diagram illustrating an example of a print job list managed by the copying machine 1001.

The print job list is a set of a plurality of pieces of bibliographic information 306 to 316.

Bibliographic information is generated when the client computer 1005 has submitted a print job to the copying machine 1001, and the copying machine 1001 has processed the print job. The bibliographic information is generated from "print job information" submitted by the client computer 1005 and "device information" held in the copying machine 1001, and is stored in the bibliography server included in the copying machine 1001. The print job information is, for example, a user name and printer driver information. The device information is, for example, a model name, a serial number, and model configuration information of the copying machine.

The bibliography server collectively stores and manages pieces of bibliographic information as the print job list in the RAM 2002.

A user name 300 is information for specifying a user having submitted a print job, and is information included in the print job.

Driver information 302 represents information regarding a printer driver having generated a print job, and is information included in the print job. For example, if the print job has been generated using a printer driver common to models, the driver information 302 indicates "common to models". If the print job has been generated using a model-specific printer driver, the driver information 302 indicates a model name such as "model A".

Device identification information 304 is information for identifying a device, and is information capable of uniquely identifying a device to which a print job has been submitted. The device identification information 304 is also information read from the "device information" stored in the ROM 2003, and is composed of an alphabetical letter representing a model name and a three-digit number sequentially assigned to each individual model.

First to sixth pieces of bibliographic information regarding submitted print jobs correspond to the pieces of bibliographic information 306 to 316, respectively.

The bibliographic information 306 is bibliographic information generated when a user whose user name is "USER1" has submitted a print job to a device A001 using a printer driver common to models.

The pieces of device identification information 304 of the bibliographic information 306 and the bibliographic information 308 both indicate the same "A001". This indicates that the respective print jobs have been submitted to the same device. The pieces of device identification information 304 of the bibliographic information 306 and the bibliographic information 312 both include a common alphabetical letter, namely "A", but include three-digit numbers different from each other, namely "001" and "002". This indicates that the respective devices are different devices of the same model. The pieces of device identification information 304 of the bibliographic information 306 and the bibliographic information 310 include alphabetical letters different from each other, namely "A" and "B". This indicates that the respective devices are of different models.

In the present exemplary embodiment, the device identification information 304 includes the model name of a device. The model name of a device, however, may be prepared as another attribute.

In the present exemplary embodiment, examples of the bibliographic information include the user name 300, the driver information 302, and the device identification information 304. The bibliographic information, however, is not limited to these examples. The bibliographic information may include a document name of a print job, print settings such as a color/monochrome setting of a print job, settings of the number of pages/copies of a print job, and the date and time of the submission of a print job.

In the present exemplary embodiment, a description is given of an operation of the copying machine 1001 in a configuration where the copying machine 1002 requests the print job list from the copying machine 1001 having a bibliography server function and the copying machine 1002 displays the received print job list.

Figure 4:
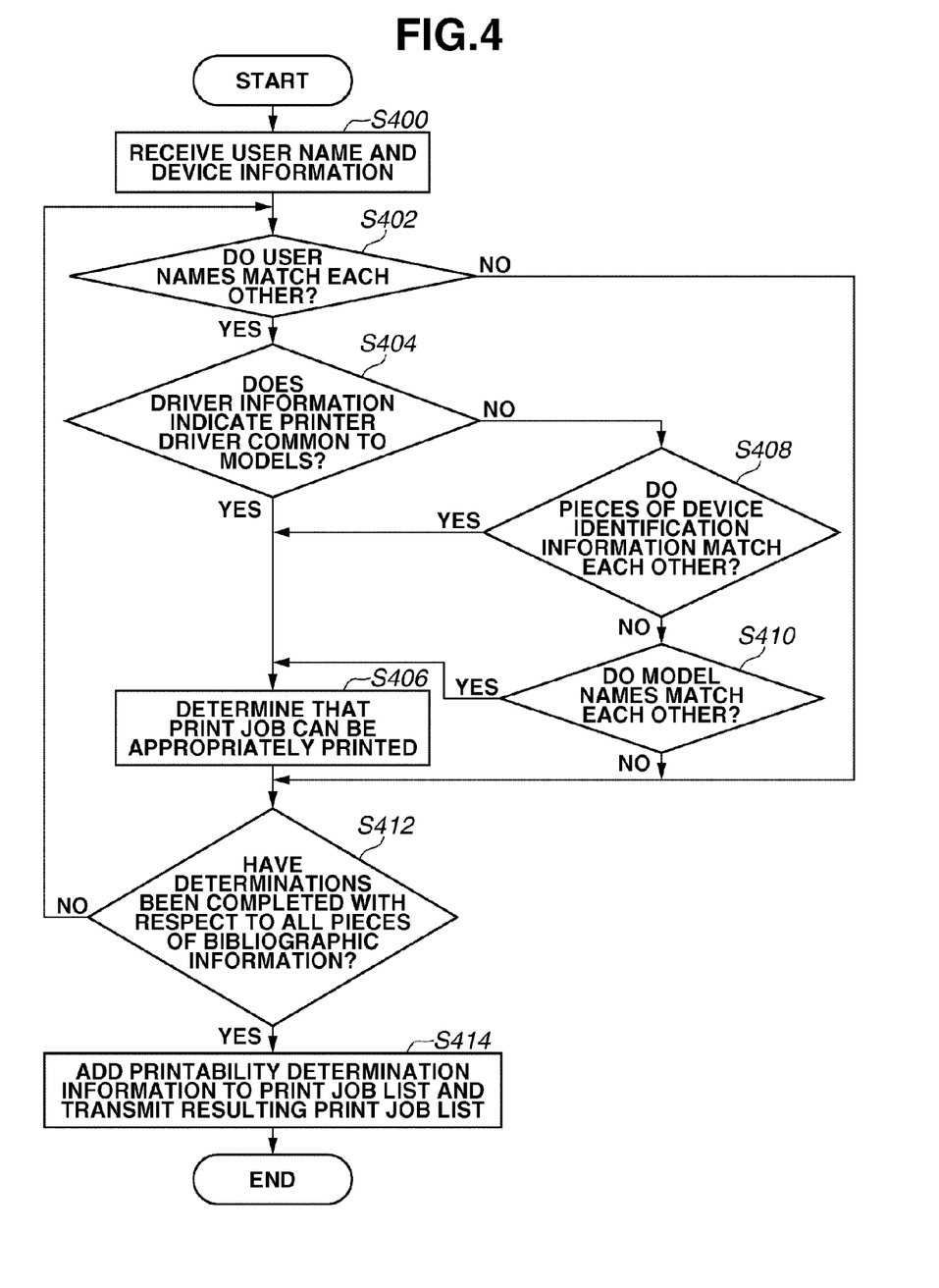
FIG. 4 is a flowchart illustrating an example of an operation of the copying machine that operates as a bibliography server.

FIG. 4 is a flowchart illustrating an example of an operation of the copying machine 1001 when the copying machine 1001 operates as a bibliography server.

The flowchart illustrated in FIG. 4 is realized by the CPU 2001 illustrated in FIG. 2 executing processing according to a program stored in the HDD 2004 illustrated in FIG. 2.

In step S400, the copying machine 1001 receives the user name and the device information regarding the copying machine 1002 from the copying machine 1002 via the LAN 1006, and the CPU 2001 proceeds to step S402. A communication protocol may be a unique protocol or a general-purpose protocol, and is not particularly defined. In the present exemplary embodiment, it is assumed that the copying machine 1001 has received "USER1" as the user name and "A001" as the device identification information from the copying machine 1002.

In step S402, the CPU 2001 determines whether or not the user name received by the copying machine 1001 from the copying machine 1002 matches the user name 300 of the bibliographic information stored in the RAM 2002. If the received user name matches the user name 300, the CPU 2001 proceeds to step S404. If the received user name does not match the user name 300, the CPU 2001 proceeds to step S412. For example, the user name 300 of the bibliographic information 306 is "USER1" and therefore matches the user name received by the copying machine 1001 from the copying machine 1002. Further, the user name 300 of the bibliographic information 310 is "USER2" and therefore does not match the user name received by the copying machine 1001 from the copying machine 1002.

In step S404, the CPU 2001 determines whether or not the driver information 302 of the bibliographic information stored in the RAM 2002 indicates a printer driver common to models. If the driver information 302 indicates a printer driver common to models, the CPU 2001 proceeds to step S406. If the driver information 302 does not indicate a printer driver common to models, that is, indicates a model-specific printer driver, the CPU 2001 proceeds to step S408. For example, the driver information 302 of the bibliographic information 306 indicates "common to models" and therefore indicates a printer driver common to models. Further, the driver information 302 of the bibliographic information 308 indicates "model A" and therefore indicates a model-specific printer driver.

In step S406, the CPU 2001 determines that the print job can be appropriately printed, and proceeds to step S412.

In step S408, the CPU 2001 determines whether or not the device identification information received by the copying machine 1001 from the copying machine 1002 matches the device identification information 304 of the bibliographic information stored in the RAM 2002. If the received device identification information matches the device identification information 304, the CPU 2001 proceeds to step S406. If the received device identification information does not match the device identification information 304, the CPU 2001 proceeds to step S410. For example, the device identification information 304 of the bibliographic information 308 indicates "A001" and therefore matches the device identification information received by the copying machine 1001 from the copying machine 1002. Further, the device identification information 304 of the bibliographic information 310 indicates "B001" and therefore does not match the device identification information received by the copying machine 1001 from the copying machine 1002.

In step S410, the CPU 2001 determines whether or not the model name included in the device identification information received by the copying machine 1001 from the copying machine 1002 matches the model name included in the device identification information 304 of the bibliographic information stored in the RAM 2002. If the model names match each other, the CPU 2001 proceeds to step S406. If the model names do not match each other, the CPU 2001 proceeds to step S412. For example, the model name included in the device identification information 304 of the bibliographic information 314 is "A" and therefore matches the model name included in the device identification information received by the copying machine 1001 from the copying machine 1002. Further, the model name included in the device identification information 304 of the bibliographic information 310 is "B"

and therefore does not match the model name included in the device identification information received by the copying machine 1001 from the copying machine 1002.

In step S412, the CPU 2001 determines whether or not the determinations have been completed with respect to all the pieces of bibliographic information. If the determination have been completed with respect to all the pieces of bibliographic information, the CPU 2001 proceeds to step S414. If the determinations have not yet been completed with respect to all the pieces of bibliographic information, the CPU 2001 returns to step S402.

In step S414, the CPU 2001 adds, to the print job list stored in the RAM 2002, the result of determining whether or not each print job can be appropriately printed, transmits the resulting print job list to the copying machine 1002 via the LAN 1006, and ends the operation. The above transmission process is an example of a second transmission.

Figure 5:
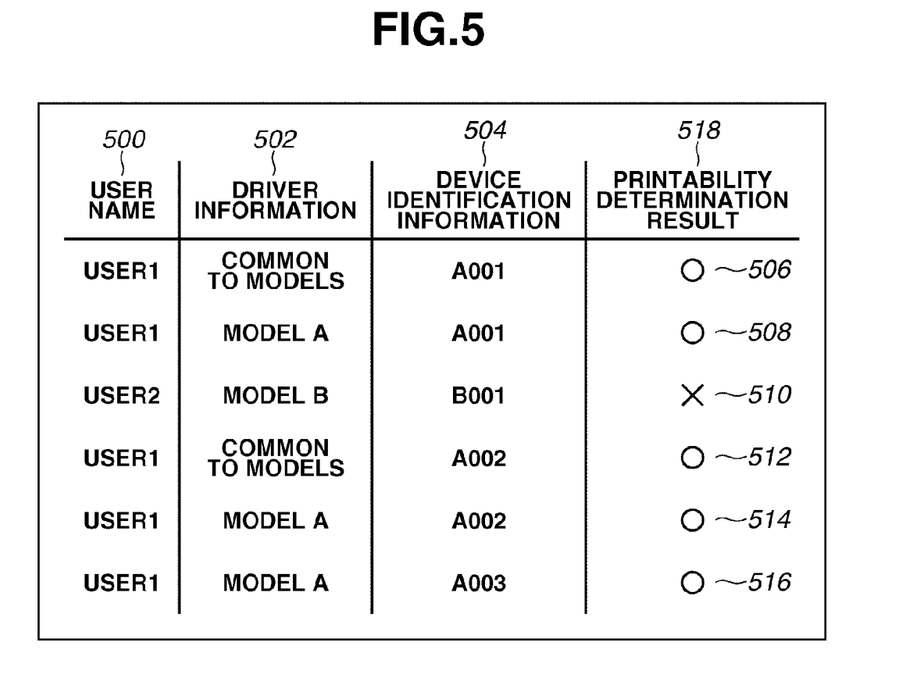
FIG. 5 is a diagram illustrating an example of the print job list and a printability determination result.

FIG. 5 is a diagram illustrating the results of determining whether or not each print job can be appropriately printed based on the bibliographic information included in the print job list illustrated in FIG. 3. Pieces of information 500 to 516 in FIG. 5 correspond to the pieces of information 300 to 316, respectively, in FIG. 3.

A printability determination result 518 indicates the result of determining whether or not a print job can be appropriately printed based on the bibliographic information included in the print job list managed by the copying machine 1001. In the printability determination result 518, the mark "o" indicates that it has been determined that the print job can be printed, and the mark "x" indicates that it has been determined the print job cannot be printed.

In the case of the bibliographic information 506, in step S404, it has been determined that the driver information of the bibliographic information stored in the RAM 2002 indicates a printer driver common to models. Consequently, it has been determined that the print job can be appropriately printed.

In the case of the bibliographic information 508, in step S408, it has been determined that the device identification information received by the copying machine 1001 from the copying machine 1002 matches the device identification information of the bibliographic information stored in the RAM 2002. Consequently, it has been determined that the print job can be appropriately printed.

In the case of the bibliographic information 510, in step S402, it has been determined that the user name received by the copying machine 1001 from the copying machine 1002 does not match the user name of the bibliographic information stored in the RAM 2002. Consequently, it has been determined that the print job cannot be appropriately printed.

In the case of the bibliographic information 512, in step S404, it has been determined that the driver information received by the copying machine 1001 from the copying machine 1002 indicates a printer driver common to models. Consequently, it has been determined that the print job can be appropriately printed.

In the case of the bibliographic information 514, in step S410, it has been determined that the model name included in the device identification information received by the copying machine 1001 from the copying machine 1002 matches the model name included in the device identification information of the bibliographic information stored in the RAM 2002. Consequently, it has been determined that the print job can be appropriately printed.

In the case of the bibliographic information 516, in step S410, it has been determined that the model name included in the device identification information received by the copying machine 1001 from the copying machine 1002 matches the model name included in the device identification information of the bibliographic information stored in the RAM 2002. Consequently, it has been determined that the print job can be appropriately printed.

Based on the above results, it is possible to determine whether or not the submitted print job can be appropriately printed. Thus, it is possible to notify a device to perform the print output of printability determination information.

In a second exemplary embodiment, a description is given of an operation of the copying machine 1002 in a configuration where the copying machine 1002 requests the print job list from the copying machine 1001 having a bibliography server function, and the copying machine 1002 displays the received print job list. The present exemplary embodiment is different from the first exemplary embodiment in that the description is given of the operation of the copying machine 1002, not the copying machine 1001, in the present exemplary embodiment.

Figure 6:
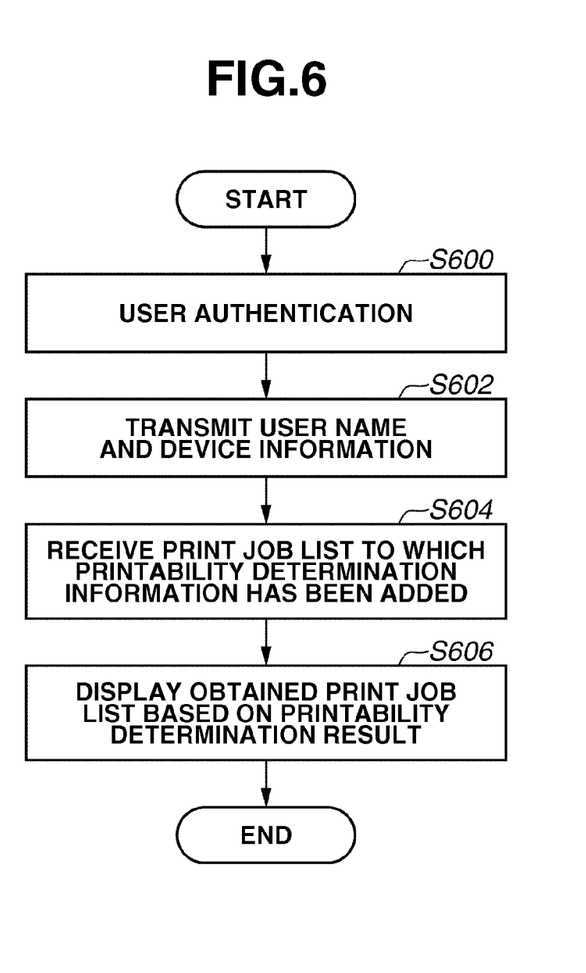
FIG. 6 is a flowchart illustrating an example of an operation of displaying the print job list.

FIG. 6 is a flowchart illustrating an example of an operation of the copying machine 1002 when the copying machine 1002 displays the print job list.

The flowchart illustrated in FIG. 6 is realized by the CPU 2001 illustrated in FIG. 2 executing processing according to a program stored in the HDD 2004 illustrated in FIG. 2.

In step S600, the CPU 2001 of the copying machine 1002 carries out authentication of a user attempting to operate the copying machine 1002 to execute print output, and proceeds to step S602. The CPU 2001 may perform the user authentication by any method so long as the CPU 2001 can obtain the user name. For example, the method may be such that the CPU 2001 displays a user authentication screen (not illustrated) on the operation unit 2012 via the operation unit I/F 2006, obtains input information regarding a user name and a password via the operation unit I/F 2006, and compares the input information with authentication information, thereby performing the user authentication. Alternatively, the method may be such that the CPU 2001 obtains user information from a card reader (not illustrated) included in the copying machine 1002.

In step S602, the CPU 2001 of the copying machine 1002 transmits, to the copying machine 1001 via the LAN 1006, the user name obtained by the copying machine 1002 in step S600 and the device information regarding the copying machine 1002 which the copying machine 1002 holds in the ROM 2003, and the CPU 2001 proceeds to step S604. In the present exemplary embodiment, it is assumed that the CPU 2001 of the copying machine 1002 has transmitted "USER1" as the user name and "A001" as the device identification information. The above transmission process is an example of the process of a first transmission.

In step S604, the CPU 2001 of the copying machine 1002 receives, from the copying machine 1001 via the LAN 1006, the print job list to which the printability determination information has been added, and the CPU 2001 proceeds to step S606. In the present exemplary embodiment, an example of the print job list which has been received by the copying machine 1002 from the copying machine 1001 and to which the printability determination information has been added is the print job list in FIG. 5 described in the first exemplary embodiment.

In step S606, the CPU 2001 of the copying machine 1002 displays the obtained print job list on the operation unit 2012 based on the printability determination result 518.

FIG. 7 is a diagram illustrating an example of a print job list screen displayed on the operation unit 2012.

Pieces of information 702 to 736 described on a screen 700, which is an example of the entire screen, are described below.

A user name is displayed in a region 702 and indicates "USER1" in the present exemplary embodiment.

The document name of a print job is displayed in a region 704. The print settings of a print job are displayed in a region 706. The number of pages and the number of copies of a print job are displayed in a region 708. The date and time of a print job is displayed in a region 710.

The print jobs include pieces of bibliographic information 712 to 720, and only the pieces of bibliographic information whose printability determination information indicates "o" are displayed. Thus, the pieces of bibliographic information 506, 508, 512, 514, and 516 are displayed as the pieces of bibliographic information 712, 714, 716, 718, and 720, respectively. The pieces of information 704 to 710 are not managed as the pieces of bibliographic information in FIG. 5. The print settings and the like, however, are included in the bibliographic information to be managed, where necessary.

The number of the currently displayed page and the total number of pages are displayed in a region 722. The screen 700, which is an example of the print job list screen, displays the first page of a total of one page. A button 724 is a button for displaying the previous page, and a button 726 is a button for displaying the next page.

A "select all" button 728 is used to select all the pieces of bibliographic information. A "cancel selection" button 730 is used to cancel the selection of a selected piece of bibliographic information.

A "delete" button 732 is used to delete a selected piece of bibliographic information.

A "change print setting" button 734 is used to display a print setting screen (not illustrated) and change a print setting.

A "start printing" button 736 is used to start printing a selected piece of bibliographic information.

Figure 8:
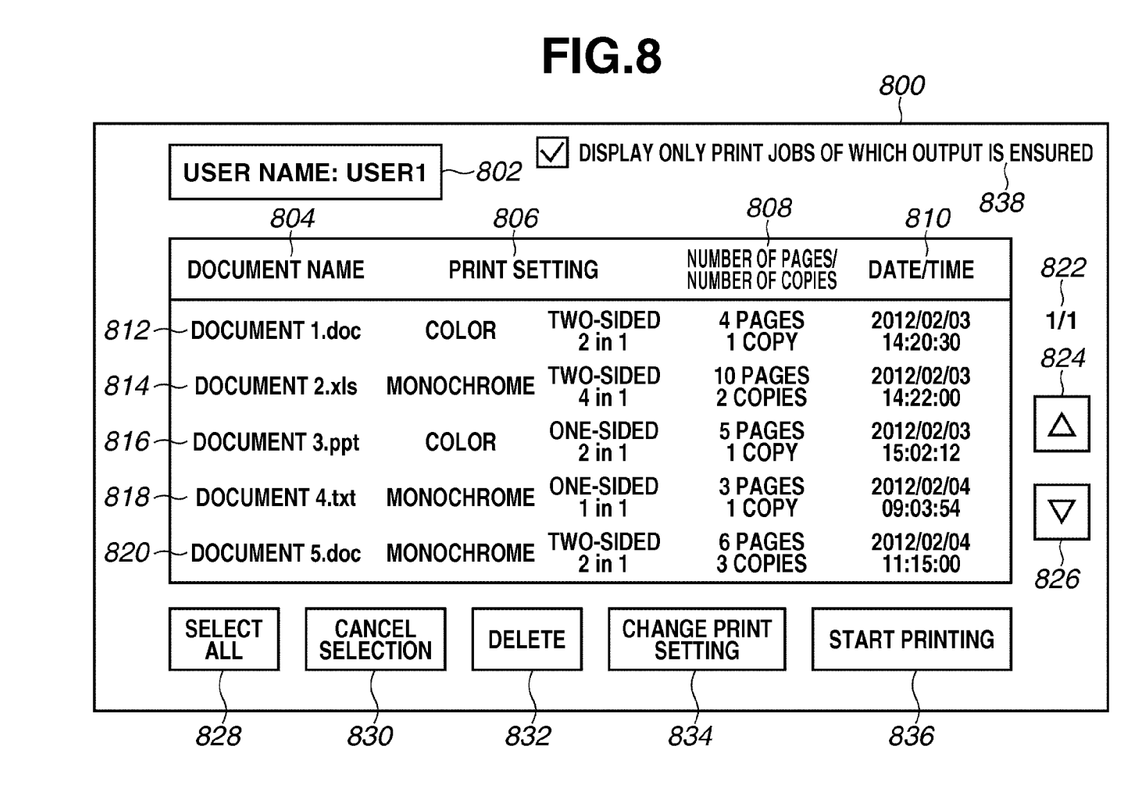
FIG. 8 is a diagram illustrating an example of the print job list screen.

The screen 700 in FIG. 7, which is an example of the entire print job list screen, may be displayed as illustrated in FIG. 8. Pieces of information 800 to 836 correspond to the pieces of information 700 to 736, respectively.

A check box 838 is such that if the check box is checked, only the print jobs of which output is ensured are displayed. The check box 838 is such that, on the other hand, if the check box is unchecked, print jobs are displayed including also the print jobs of which output is not ensured. In the present exemplary embodiment, the check box is checked, and therefore, the bibliographic information 510 of which the printability determination result 518 indicates "x" is not displayed.

Based on the above results, even when a print job list of submitted print jobs is displayed on a screen, it is possible to determine on the screen a print job that can be appropriately printed.

In a third exemplary embodiment, a description is given of another example of the operation of the copying machine 1001 in the configuration, described in the first exemplary embodiment, where the copying machine 1002 requests the print job list from the copying machine 1001 having a bibliography server function, and the copying machine 1002 displays the received print job list.

Figure 9:
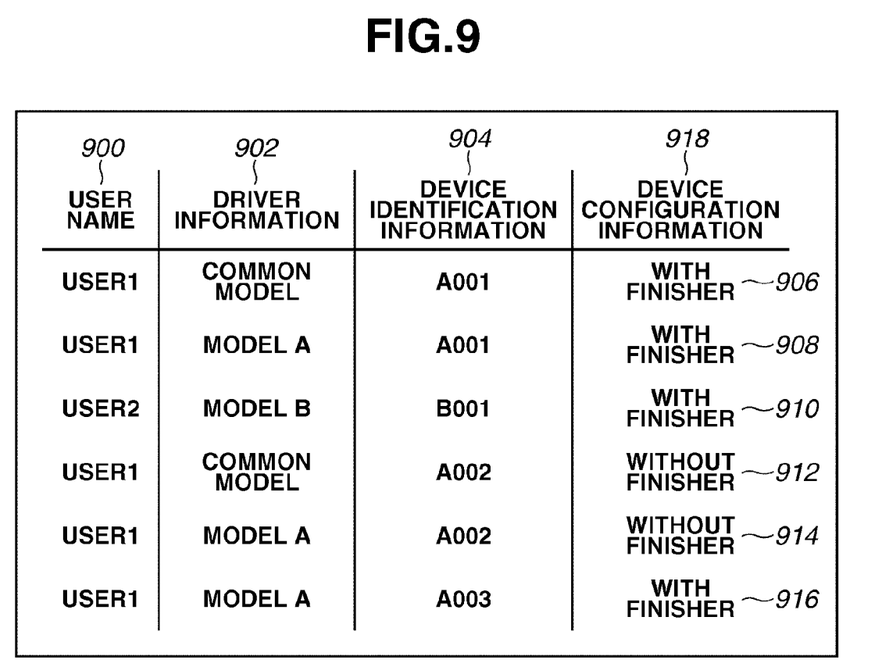
FIG. 9 is a diagram illustrating an example of the print job list and device configuration information.

The present exemplary embodiment is different from the first exemplary embodiment in that as illustrated in FIG. 9, device configuration information 918 is added to the bibliographic information included in the print job list in the present exemplary embodiment.

Pieces of information 900 to 916 in FIG. 9 correspond to the pieces of information 300 to 316, respectively, in FIG. 3.

The device configuration information 918 is information read from the "device information" stored in the ROM 2003. In the present exemplary embodiment, the device configuration information 918 is described using an example where the device configuration information 918 indicates whether or not a finisher is connected. Alternatively, the device configuration information 918 may indicate other device configuration information such as the number of sheet feeding cassettes.

Figure 10:
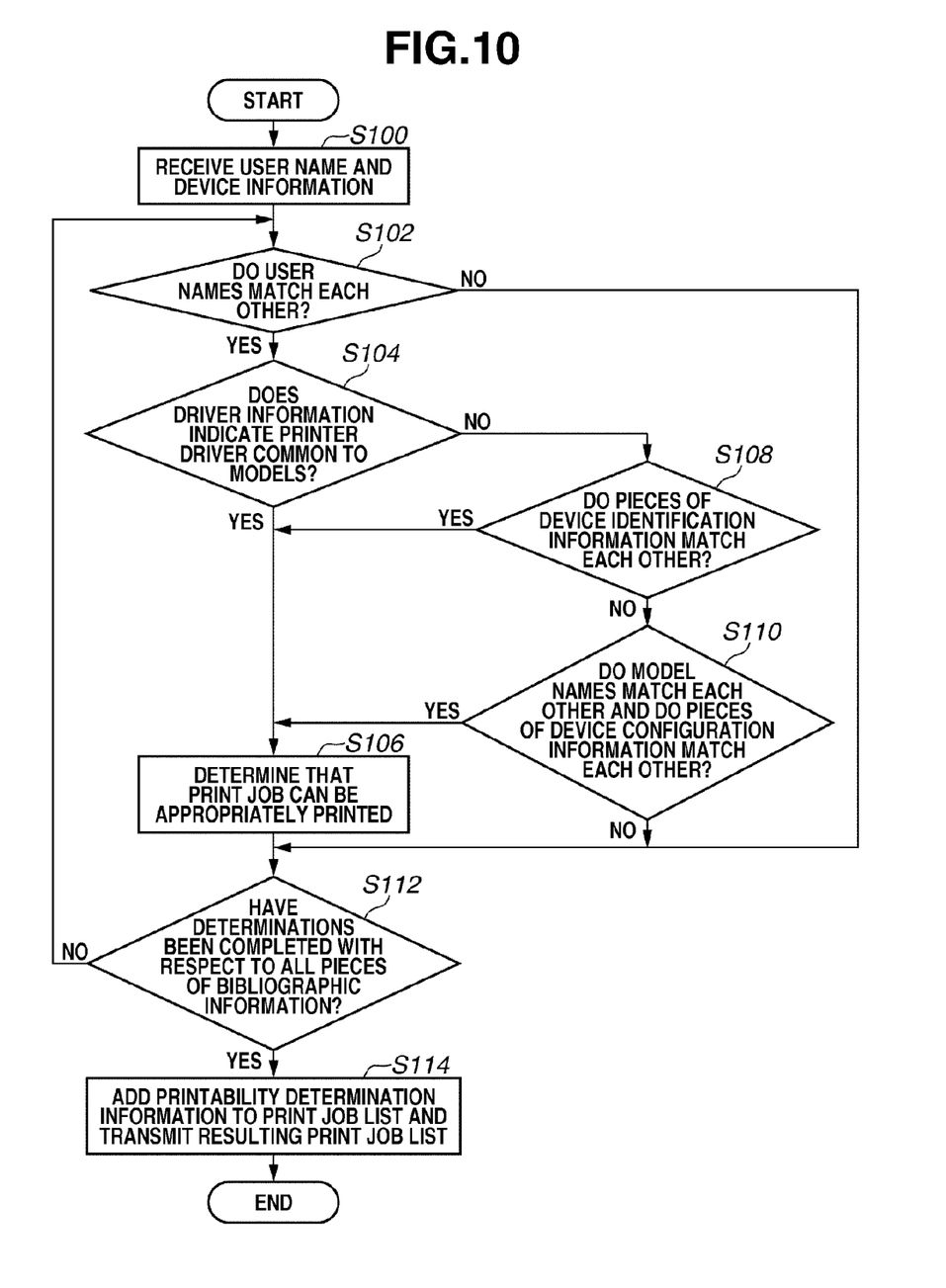
FIG. 10 is a flowchart illustrating an example of an operation of the copying machine that operates as the bibliography server.

FIG. 10 is a flowchart illustrating an example of the operation of the copying machine 1001 when the copying machine 1001 operates as a bibliography server.

The flowchart illustrated in FIG. 10 is realized by the CPU 2001 illustrated in FIG. 2 executing processing according to a program stored in the HDD 2004 illustrated in FIG. 2. The description of the flowchart here is almost similar to that of FIG. 4 described above. Thus, only the differences are described below. In the present exemplary embodiment, it is assumed that the copying machine 1001 has received "USER1" as the user name, "A001" as the device identification information, and "with finisher" as the device configuration information.

In step S108, the CPU 2001 determines whether or not the device configuration information included in the device identification information received by the copying machine 1001 from the copying machine 1002 matches the device configuration information 918 of the bibliographic information stored in the RAM 2002. In step S110, the CPU 2001 determines whether or not the model name included in the device identification information received by the copying machine 1001 from the copying machine 1002 matches the model name included in device identification information 904 of the bibliographic information stored in the RAM 2002.

If the model names match each other and the received device configuration information matches the device configuration information 918, the CPU 2001 proceeds to step S106. If the model names do not match each other or the received device configuration information does not match the device configuration information 918, the CPU 2001 proceeds to step S112. For example, the model name included in the device identification information 904 of the bibliographic information 914 is "A" and therefore matches the model name included in the device identification information received by the copying machine 1001 from the copying machine 1002. Further, the device configuration information 918 of the bibliographic information 914 indicates "without finisher" and therefore does not match the device configuration information received by the copying machine 1001 from the copying machine 1002.

Figure 11:
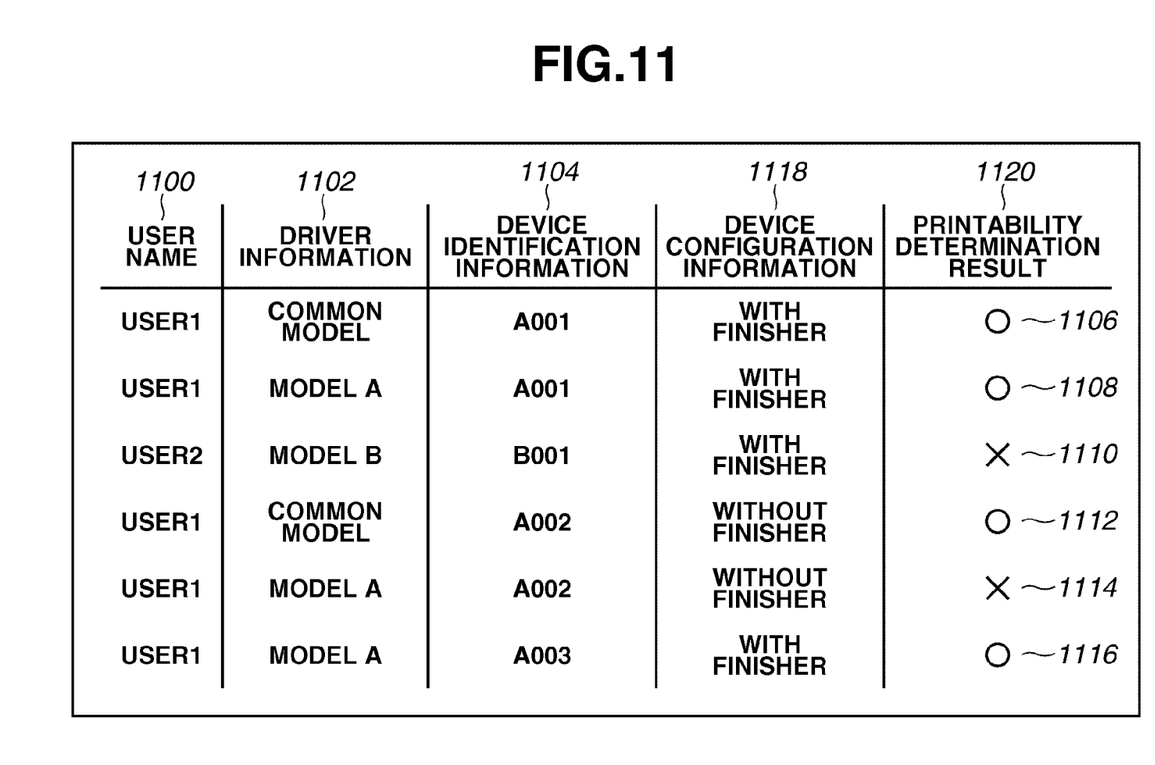
FIG. 11 is a diagram illustrating an example of the print job list and a printability determination result in a third exemplary embodiment.

FIG. 11 is a diagram illustrating the result of determining whether or not each print job can be appropriately printed based on the bibliographic information included in the print job list illustrated in FIG. 9. Pieces of information 1100 to 1118 in FIG. 11 correspond to the pieces of information 900 to 918, respectively, in FIG. 9.

A printability determination result 1120 indicates the result of determining whether or not a print job can be printed based on the print job list managed by the copying machine 1001. In the printability determination result 1120, the mark "o" indicates that it has been determined that the print job can be printed, and the mark "x" indicates that it has been determined that the print job cannot be printed.

In the case of the bibliographic information 1114, in step S110, it has been determined that the received device configuration information does not match the device configuration information of the bibliographic information stored in the RAM 2002. Consequently, it has been determined that the print job cannot be appropriately printed.

As described above, the device configuration information is added to the determination of whether or not a submitted print job can be appropriately printed, whereby it is possible to make the determination taking into account a model-dependent finishing function such as a finisher.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Based on the processing according to the above exemplary embodiments, it is possible to select and execute a print job that can be appropriately subjected to print output.

While the preferred exemplary embodiments of the present invention have been described in detail, the present invention is not limited to such particular exemplary embodiments, but can be modified and changed in various manners within the scope of the present invention described in the appended claims.

According to the present invention, it is possible to determine and execute, among a plurality of submitted print jobs, a print job that can be appropriately printed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-179427 filed Aug. 13, 2012, which is hereby incorporated by reference herein in its entirety.

What is claimed is:

1. A printing system comprising a plurality of image forming apparatuses and a bibliographic server, the bibliographic server comprising:
a storage unit configured to store print job information, the print job including user identification information for specifying a user having submitted a print job, driver information indicating a printer driver which has generated the print job, and device identification information for identifying a first image forming apparatus storing the print job;
a reception unit configured to receive a request of a print job listing including user identification information for specifying a user currently logging in to a second image forming apparatus; and
a control unit configured to specifying a print job which is stored in the first image forming apparatus corresponding to the user currently logging into the second image forming apparatus based on the user identification information and then determine whether the specified print job can be appropriately printed by the second image forming apparatus based on the driver information and the device identification information; and
a transmission unit configured to transmit to the second image forming apparatus the print job list with printability determination information indicating a result of the determination,
wherein the second image forming apparatus is configured to display the print job list based on the printability determination information.

2. The print system according to claim 1, wherein, when the second image forming apparatus is operable to print the print job, the second image forming apparatus is configured to display bibliographic information regarding the print job on a display unit.

3. The print system according to claim 1, wherein the drive information indicates a driver common to models or a driver depending on models.

4. A method of controlling print system comprising a plurality of image forming apparatuses and a bibliographic server, the method comprising:
storing print job information, the print information including user identification information for specifying a user having submitted print job, drive information indicating a printer driver which has generated the print job, and device identification information for identifying a first image forming apparatus storing the print job;
receiving a request a print job list including user identification information for specifying a user currently logging into a second image forming apparatus;
specifying a print job stored in the first image forming apparatus corresponding to the user currently logging to the second image forming apparatus based on the user identification information and then determine whether the specified print job can be appropriately printed by the second image apparatus based on the driver information and the device identification information;
transmitting to the second image forming apparatus the print job list with printability determination information indicating a result of the determination, wherein the second image forming apparatus is configured to display the print job list based on the printability determination information.

5. A non-transitory computer-readable storage medium storing a program for causing a computer to execute a method of controlling a print system comprising a plurality of image forming apparatuses and a bibliographic server, the method comprising:
storing print job information, the print job information including user identification information for specifying a user having submitted a print job, drive information indicating a printer driver which has generated the print job, and device identification information for identifying a first image forming apparatuses storing the print job;
receiving a request of a print job list including user identification information for specifying a user currently logging in a second image forming apparatus;
specifying a print job stored in the first image forming apparatus corresponding to the user currently logging to the second image forming apparatus based on the user identification information and then determine whether the specified print job can be appropriately printed by the second image apparatus based on the driver information and the device identification information;
transmitting to the second image forming apparatus the print job list with printability determination information indicating a result of the determination, wherein the second image forming apparatus is configured to display the print job list based on the printability determination information.

* * * * *